United States Patent [19]
Fehl et al.

[11] 3,938,845
[45] Feb. 17, 1976

[54] GRIPPING DEVICE OF A LIFTING DEVICE, ESPECIALLY IN A CORE REACTOR FOR DEPOSITING AND PICKING UP OF FUEL ELEMENTS AND CONTROL RODS

[75] Inventors: Anton Fehl; Bernhard Hoffmeister, both of Wilhelmshaven, Germany

[73] Assignee: Fried. Krupp Gesellschaft mit beschrankter Haftung, Essen, Germany

[22] Filed: Apr. 1, 1974

[21] Appl. No.: 456,959

[30] Foreign Application Priority Data
Apr. 5, 1973 Germany............................ 2317014

[52] U.S. Cl................ 294/86 A; 176/30; 176/36 R; 294/88
[51] Int. Cl.²......................................... G21C 19/10
[58] Field of Search............ 294/83 AA, 86 A, 86.1, 294/86.15, 86.29, 86.33, 88, 90, 115; 176/12, 15, 27, 30, 35, 36 R, 36 C; 214/18 N

[56] References Cited
UNITED STATES PATENTS

| | | |
|---|---|---|
| 2,924,483 | 2/1960 | Koch et al. ........................ 294/86 A |
| 3,163,585 | 12/1964 | Metcalfe et al. ................... 176/30 X |
| 3,597,317 | 8/1971 | Isaac ..................................... 176/30 |
| 3,690,715 | 9/1972 | Vanlingen et al. ..................... 294/88 |

FOREIGN PATENTS OR APPLICATIONS
1,808,598  6/1970  Germany .......................... 294/86 A Primary Examiner—Evon C. Blunk
Assistant Examiner—Johnny D. Cherry
Attorney, Agent, or Firm—Walter Becker

[57] ABSTRACT

A device for the placement of rod shaped fuel elements and control bars especially in a nuclear reactor, in which a gripper body is adapted for being connected to gripper tools and which gripper tools are engageable with the elements to be placed. The gripper tools are carried in a frame and are moveable in the frame laterally to the axis of the gripper body so as to selectively be engageable therewith. A single power operated device in the gripper body is provided for actuating the gripper elements carried by the gripping tools.

39 Claims, 11 Drawing Figures

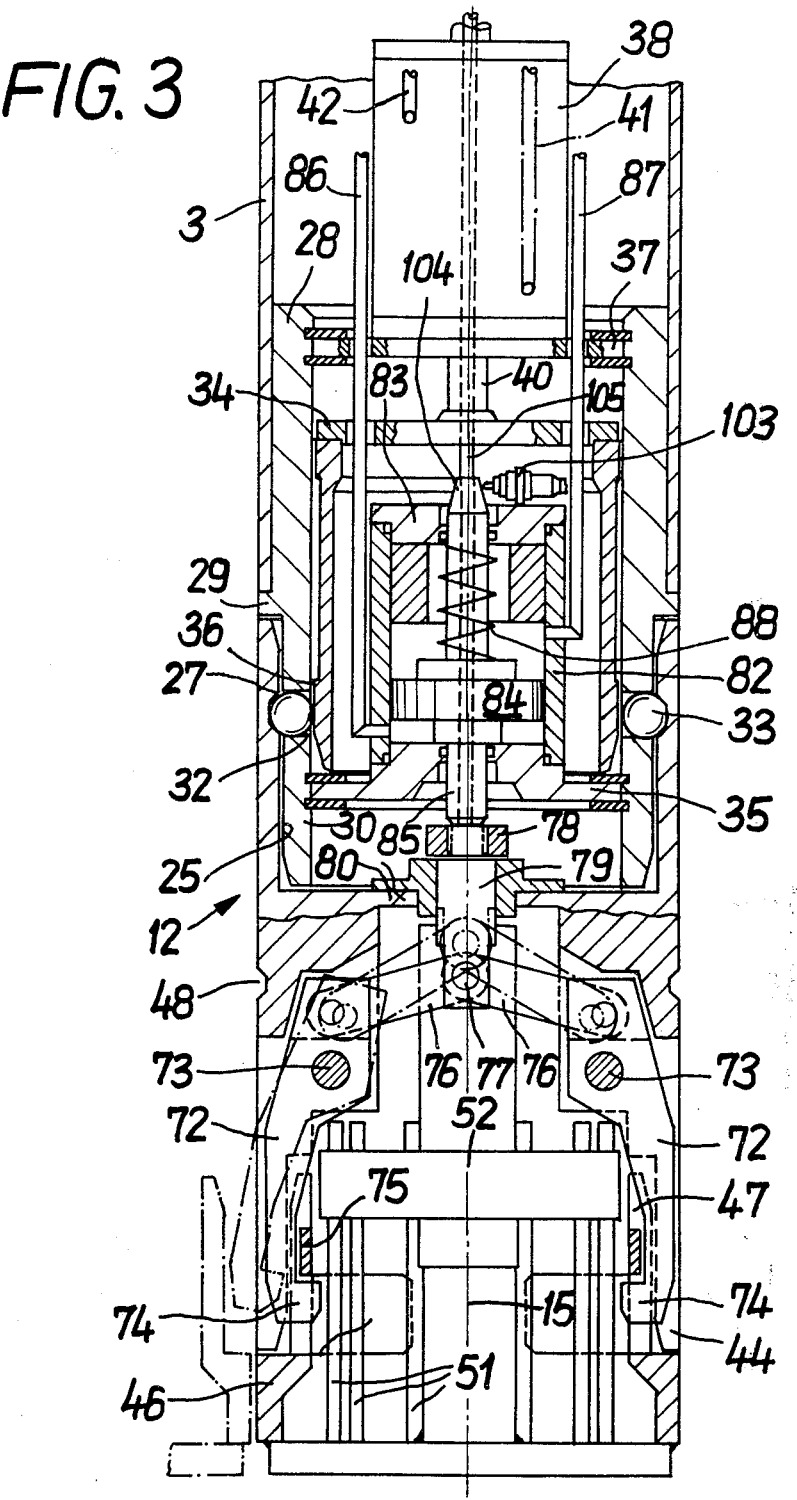

GRIPPING DEVICE OF A LIFTING DEVICE, ESPECIALLY IN A CORE REACTOR FOR DEPOSITING AND PICKING UP OF FUEL ELEMENTS AND CONTROL RODS

In core reactors it is necessary from time to time to exchange the rod shaped fuel elements which means that it is necessary to pull out burned-off fuel elements from the reactor core, to convey the same to a storage place and there to place the same into a storage frame whereas new fuel elements have to be withdrawn from the storage place, conveyed to the core reactor and inserted into the same. Moreover, the control bars inserted in bores of fuel elements have to be pulled out from time to time from the burned-off fuel elements and to be inserted into other fuel elements.

A charging device intended for this purpose has become disclosed in German Pat. No. 1,764,176 corresponding to U.S. Pat. No. 3,691,011—Krüger issued Sept. 12, 1972. This known device is characterized primarily by a vertically movable double gripper with an automatically operable control rod gripper and with a fuel element gripper. The fuel element gripper head is located at the lower end of a control bar guiding insert which is in vertical direction displaceably guided in a centering bell. This centering bell is in its turn vertically displaceably guided in a guiding post which extends downwardly from the carriage frame of the charging device. Within the guiding insert for the control bar there is vertically displaceably guided a control rod gripper lever system having at its lower end provided a control bar gripper head. The upper end of said control rod gripper lever system is engaged by a cable winch. By lifting said lever system by means of said winch, the control bar guiding insert which in this instance rests with its upper flange upon the control bar gripper head is lifted, while after a certain stroke, the centering bell is taken along.

It is an object of the present invention to provide a gripper device of a lifting device for longitudinally extending bodies which pertain to at least two different groups with different functions, especially in a core reactor, for depositing and picking up fuel elements and control bars in a particularly simple and thus relatively inexpensive manner which is also practically foolproof.

These and other objects and advantages of the invention will appear more clearly from the following specification in connection with the accompanying drawings, in which:

FIGS. 1, 3 and 4 illustrate in axial sections parallel to a square side the lower portion of a gripper body adapted to be lifted and lowered and also showing a gripper tool of a square cross section and a fuel element head shown in FIGS. 1 and 3 and a gripper tool holding means FIG. 4.

Figure 1:
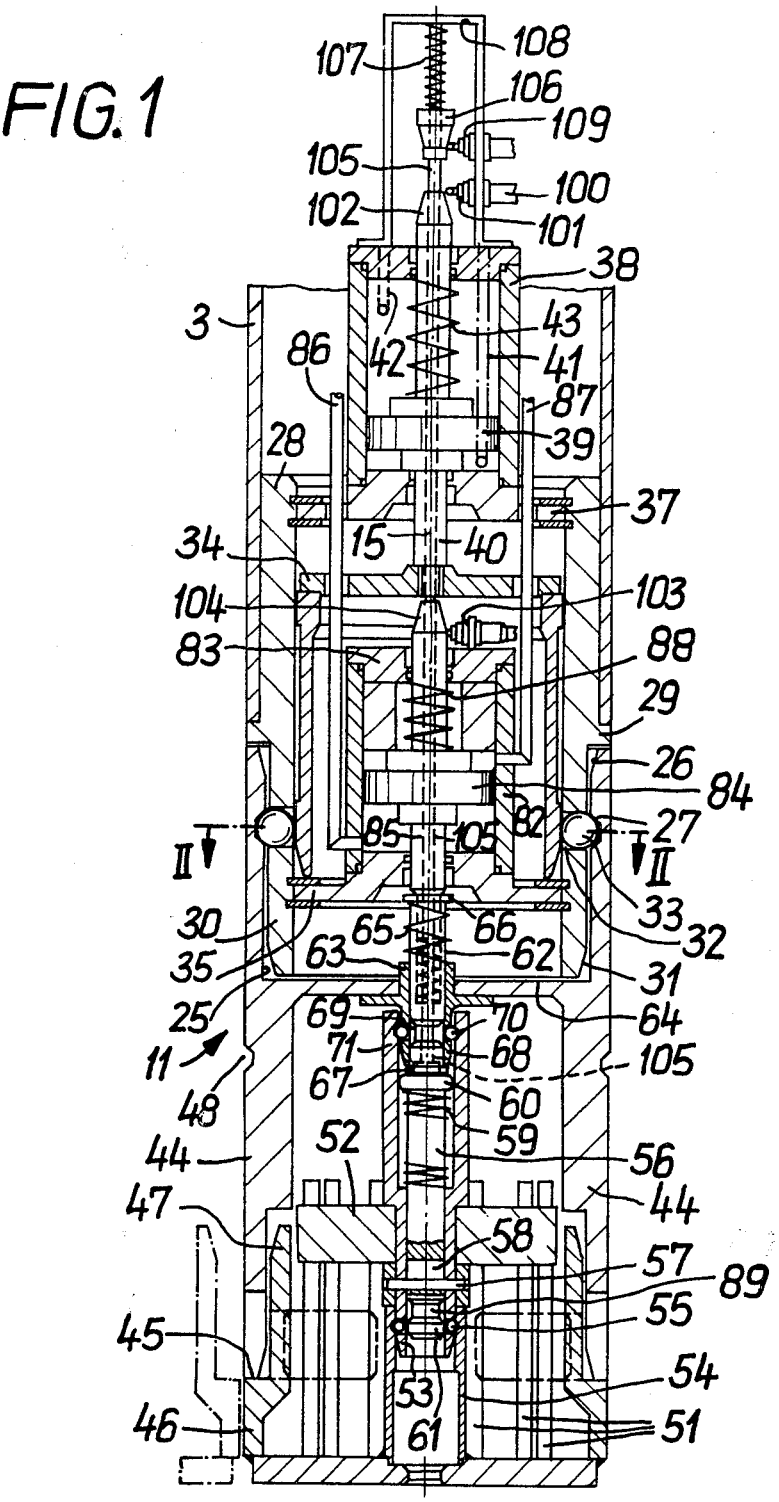
Figure 2:
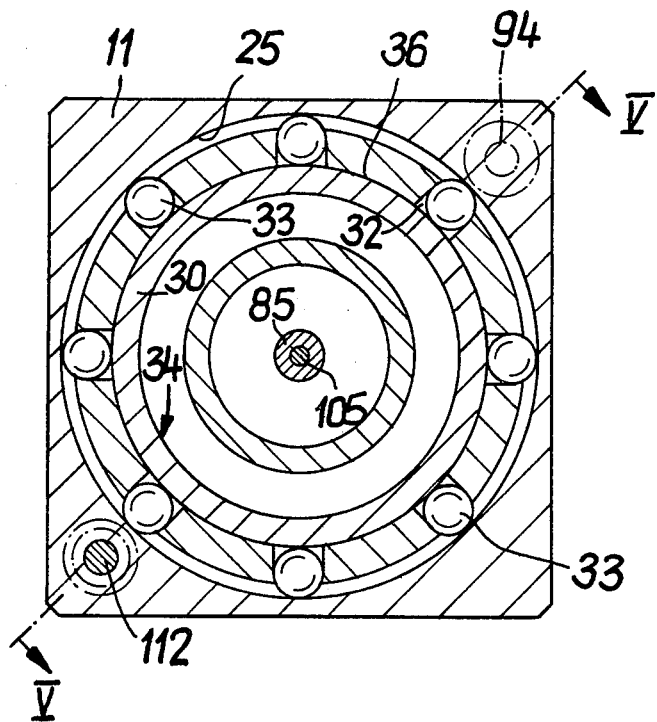
FIG. 2 is a section taken along the line II—II of FIG. 1.
Figure 7:
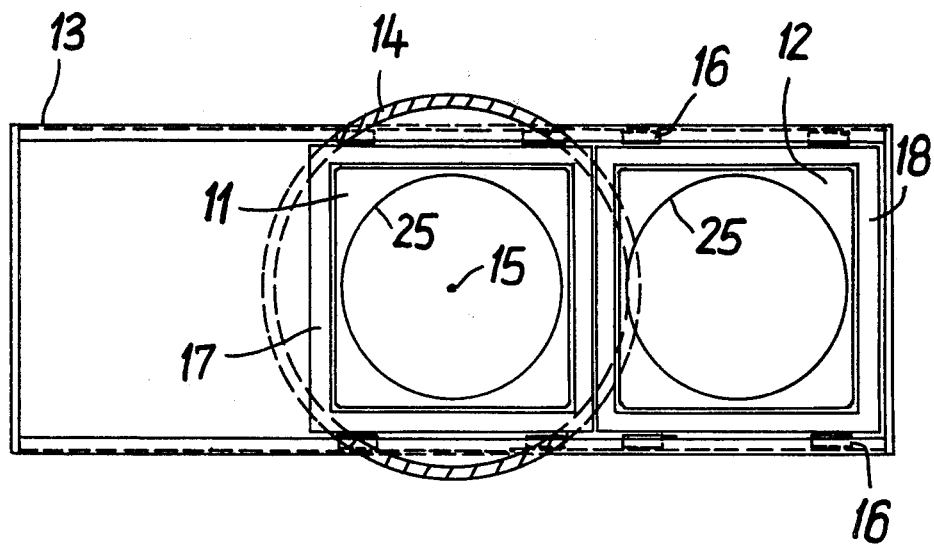
FIG. 7 represents a section taken along line VII—VII of FIG. 6.

The gripper device according to the present invention is characterized primarily in that of various gripper tools of which each is determined for a group of longitudinal extending bodies, always only one is adapted to be coupled with the gripper body which includes a power operable device suitable for actuating all gripper tools. Thus, the present invention which differs fundamentally from the heretofore known double gripper brings about the advantage that for the actuation of different grippers, for instance a fuel element gripper and a control rod gripper, only one power operable device has to be arranged in the gripper body which is adapted to be lifted and lowered while it is left to the operator, if desired, to actuate also more than two groups of longitudinally extending bodies by means of one and the same power operable device since without difficulty a corresponding number of gripper tools could be provided.

It is particularly advantageous in this connection when the two or more gripper tools which are employed selectively are arranged in one device at the lower end of a guiding post while selectively one of the gripper tools may be moved into a position in which it can be coupled to the gripper body adapted to be lifted and lowered. In this way even without the embodiment of a double gripper, unnecessary movements of the loading or charging device carrying the guided post will be avoided.

Referring now to the drawings in detail, the arrangement shown therein comprises a hollow cylindrical guiding post 1 (FIG. 6) which extends downwardly from the frame of a loading or charging device which is movable above a container containing the core of a reactor and above a bearing vat for fuel elements. Within said hollow cylindrical guiding post 1 is, by means of rollers 2 a hollow gripper body 3 of square shaped cross section vertically displaceably guided. For lifting and lowering the gripper body 3 there is provided a cable winch which is mounted on the frame of said carriage and from which extend two cables 4 the lower ends of which are by means of bolts 5 connected to the upper ends of racks 6. These racks 6 are by means of rollers 8 vertically displaceably guided within a pot-shaped supporting body 7. The teeth of the two racks 6 face each other and mesh with two pinions 9, the axes of which are journaled in the supporting body 7 so that the latter is supported by the cables 4 which are uniformly loaded. The supporting body 7 is with radial play vertically guided in the upper portion of the gripper body 3. Provided on the gripper body 3 on the upper end face thereof is an annular flange 10 which when lifting the supporting body 7 rests thereon. One of two gripper tools 11, 12 may selectively be coupled to the lower end of the gripper body 3. Both gripper tools have the same outer shape and the same outer dimensions. The cross section is square shaped with the same length of the sides as the cross section of the gripper body 3. The two gripper tools 11 and 12 are supported by a device at the lower end of the guiding post. This device has a rectilinear frame 13 which is mounted on a narrow downwardly directed extension 14 of the guiding post 1 and extends in horizontal direction on both sides of the center line 15 of the guiding post 1 and the gripper body 3 to the same extent. The spars of the frame 13 have a U profile and receive rollers 16 which are journaled in pairs on the upper ends of two pot-shaped holding means 17, 18 while being located on opposite sides. Each of the holding means 17, 18 has inserted through with slight play a gripper tool 11, 12 in such a way that the upper parts of the gripper tool project upon the rims of the holding means 17, 18.

Figure 6:
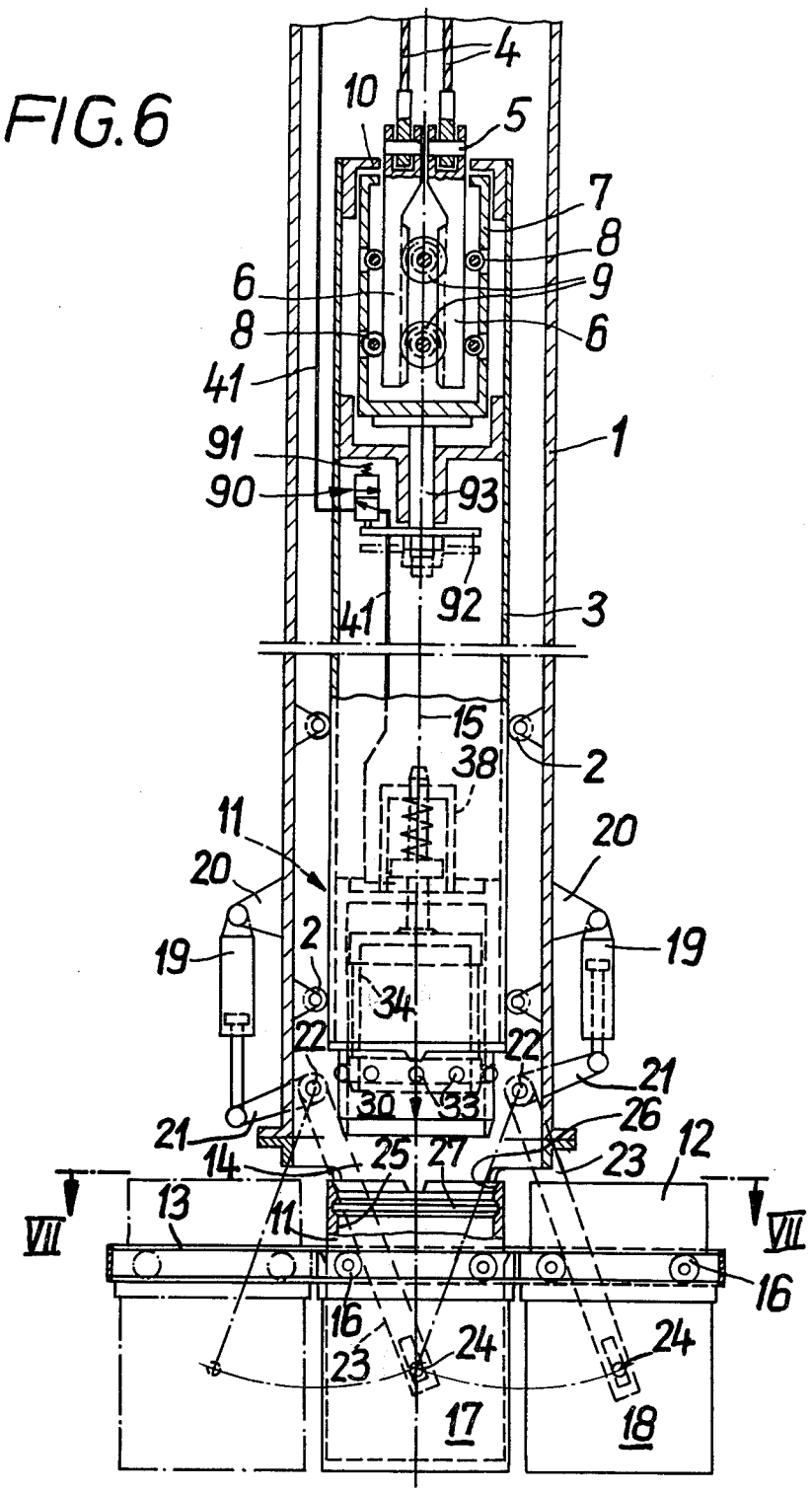
FIG. 6 illustrates partially in axial section and partially in side view the lower portion of a guiding post, a gripper head with a rod receiving means and a device for receiving holding means for gripper tools.

In the position of the holding means 17, 18 which is shown in FIG. 6 in solid lines, there is also provided the gripper tool 11 arranged in the holding means 17, said gripper tool being located along the central axis below the gripper body 3, whereas the holding means 18 with the gripper 12 is moved to the right hand end of the frame 13.

For purposes of moving the holding means 17 and 18 within the frame 13, there are provided two pneumatic adjusting devices, the cylinders 19 of which are suspended on brackets or cantilevers 20 on opposite sides of the guiding post 1. The connecting rods of the pneumatic adjusting devices engage short legs 21 of two angle levers which are located on the guiding post 1 by means of axles 22, the center lines of which are parallel to the axes of rotation of the rollers 16. Mounted on the axles 22 on opposite sides of the guiding post 1 are downwardly extending relatively long legs 23 the lower ends of which in a coulisse-like manner embrace pivots 24 on the holding means 17 and 18 respectively.

The two gripper tools have similar upper guiding means which are formed by bores 25 of the same diameter and the same depth. The upper rims of the bores 25 are at 26 broadened in a conical manner. In bores 25 there are provided at the same level annular grooves 27 of the same trapezoidal profile.

As clutch foot or pedal of the gripper body 3 serves a housing 28 (FIG. 4) the upper portion of which has a square-shaped cross section which equals the inner cross section of the gripper housing 3 and is inserted from below into said housing 3 until it engages a flange 29 on the lower end face of the gripper body 3. The lower portion of the housing 28 is formed by a cylindrical collar 30, the outer diameter of which is by a slight play shorter than the diameter of the bore 25.

The length of the collar 30 measured from the flange 29 is by a slight play greater than the depth of the bore 25. At the lower end, the circumferential surface of the collar 30 tapers at 31 in a conical manner. The collar 30 has a plurality of radial bores 32 at such a level that when the collar 30 is moved into the bore 25 up to the bottom, the radial bores 32 are located centrally opposite the annular groove 27. Located in said bores 32 are supporting balls 33 the diameter of which is greater than the length of the bores.

Figure 4:
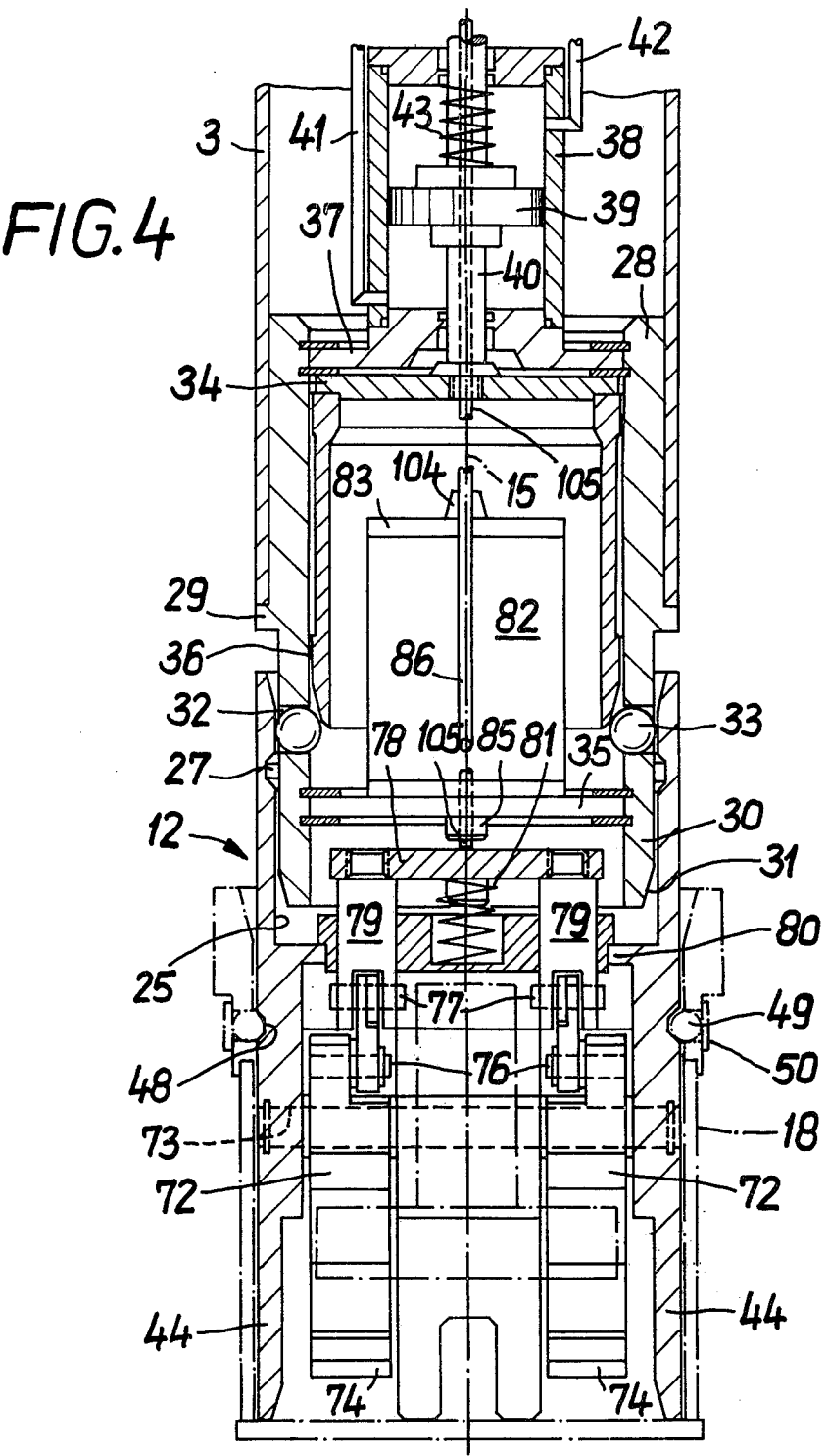

In the interior of the housing 28 (FIG. 3) is vertically slidably guided a pot-shaped slide 34 which is open in downward direction. In the blocking position shown in FIGS. 1, 3, 5, 6 and 8, in which its lower rim rests on the bottom 35 of the housing, the slide 34 by means of a cylindrical surface 36 closes the bores 32 toward the inside so that the supporting balls 33 are prevented from leaving the annular groove 27. FIG. 4 shows the upper end position of the slide 34 in which position slide 34 engages the upper bottom 37 of the housing 28. Its surface 36 will then free the bores 32.

The lifting and lowering of the slide 34 is with the embodiment of FIGS. 1–7 effected by means of a pneumatic power operable device the cylinder 38 of which is located on the bottom 37 and is by means of a rod 40 connected to the pertaining piston 39 by means of the upper plate of the pot-shaped slide 34. The rod 40 extends through a bore in the bottom 37. Air conveying conduits 41 and 42 are connected to the cylinder space below the piston 39 and above the same. One of these conduits 41, 42 may alternately be connected with a compressed air source of high over-pressure whereas the other conduit may be connected with a source of compressed air of low over-pressure. Located in the upper cylinder chamber is a compression spring 43 which urges the piston 39 downwardly thereby trying to move the slide 34 into its blocking position.

The two gripper tools 11, 12 also have similar lower guiding means. These guiding means are formed by downwardly extending fingers 44 which as shown in FIG. 1 are adapted to rest upon a shoulder surface 45 of a fuel element head 46 while their outer surfaces are flush with the respective outer surfaces of the fuel element head 46. Fingers 47 which extend upwardly from the fuel element head 46 engage the chamber located on the inner side of the fingers 44.

Each gripper tool 11, 12 is approximately at half its height provided on the outside thereof with a groove 48 adapted to be engaged by balls 49 (FIG. 4) which are so arranged in bores in the upper rim portions of the holding means 17, 18 that they are able against the thrust or resistance of leaf springs 50 to move radially outwardly and thus to leave the groove 48.

The gripper tool 11 includes a gripper for grasping a bundle of control bars 51. These bars are as shown for instance in FIG. 1 inserted in bores of a fuel element and have those ends thereof which protrude from the fuel element connected to each other by a head plate 52. This plate 52 may be coupled to the fuel element head 46 by a sleeve inserted into said head plate engaging by means of downwardly extending collar 53 a sleeve 54 which extends upwardly from the fuel element head 46 and is connected to said sleeve by supporting balls 55. These balls 55 engage from radial bores of collar 53 an annular groove of the sleeve 54. Within the sleeve, a control rod 56 is vertically slidably guided between two end positions. These end positions are determined by a rod 57 connected to the head plate 52 passing in horizontal direction through a slot 58 of the control rod or bar 56. A pressure spring 59 which is located in an upwardly extending extension of the sleeve in the head plate 52 and which engages the bottom side of a flange 60 at the upper end of the control bar tends to move the control bar into the upper end position illustrated in FIG. 1. In this end position, that circumferential surface 61 which is located at the lowermost end of the control bar 56 closes off toward the inside the radial bores of the collar 53 which contain the supporting balls 55 so that the supporting balls cannot leave the annular groove of sleeve 54 which means that the head plate 52 of the control bars 51 is coupled to the fuel element head 46.

The rod gripper provided in the gripper tool 11 includes a bolt 62 which is slidably guided in a sleeve 63 centrally with regard to the center line 15. The sleeve 63 is located in a bottom 64 which closes off the bore 25 of the gripper tool 11. The upper end of bolt 62 is provided with an abutment plate 66 which is engaged by a pressure spring 65 resting on the sleeve 63. The spring 65 tends to hold the bolt 62 in the upper end position shown in FIG. 1. This upper end position is defined by a flange 67 which is located at the lower end of bolt 62 and which engages the lower rim portion of a collar 68 extending from the sleeve 63 in downward direction. In this position, a turned-out portion 69 of the bolt 62 is located opposite the radial bores in the collar 68. These radial bores contain supporting balls 70 which, when according to FIG. 1 the fingers 44 of the gripper tool 11 rest upon the shoulder surface 45 of the fuel element head 46, are adapted to enter an annular groove in the collar 68 receiving upper portions 71 of the sleeve inserted into the head plate 52.

The gripper tool 12 for grasping the fuel element head 46 has two pairs of gripper pawls 72 which are pivotally mounted in oppositely located recesses of the lower part of the gripper tool. This pivotal arrangement is effected by means of bolts 73 so that the pawls 72 can pivot about horizontal axes. The lower hook-shaped ends 74 of said pawls 72 will when occupying their coupling position (FIG. 3) engage windows of members 75 between the fingers 47, said members 75 being located on fuel element head 46. Each two oppositely located gripper pawls 72 are by means of legs extending from the bolts 73 in upward direction connected to an elbow lever system 76. The elbow joints 77 of the two pairs of elbow lever means 76 are arranged on two bolts 79 which are connected to each other by means of a cross head 78. Bolts 79 are vertically displaceably guided in vertical bores of a bottom 80 provided in the gripper tool. A pressure spring 81 resting on the bottom 80 tends to move the cross head 78 to an upper end position shown in FIG. 4 which corresponds to the opening position of the gripper pawls 72 which is illustrated in dot-dash lines in FIG. 3.

For purposes of selectively actuating one of the gripper tools 11 or 12, there is provided a single power operable device which is arranged within the housing 28 at the lower end of the gripper body 3. This power operable device is in FIGS. 1–6 represented by a pneumatic power operable device. The cylinder 82 of this power operable device is mounted on the bottom 35 and has its top closed by a cover 83. From the piston 84 reciprocably guided in the cylinder 82, a short rod 85 extends through a bore of the bottom 35. Air conveying conduits 86 and 87 are respectively connected to the cylinder chamber below the piston 84 and to the cylinder chamber above the piston 84. Of these conduits 86, 87 alternately one can be connected to a source of compressed air with high over-pressure while simultaneously the other conduit is connected to a source of compressed air with low over-pressure. In the cylinder chamber provided above the piston 84 there is located a compression spring 88 which urges the piston 84 in downward direction.

The length of the rod 85 is so selected that when one of the gripper tools 11, 12 is coupled to the gripper body 3 in the manner shown in FIGS. 1 and 3, and when the piston 84 is moved to its upper end position against the thrust of spring 88 (FIG. 1) by means of the air of higher pressure introduced into the lower cylinder chamber, it will be appreciated that with the gripper tool 11 according to FIG. 1, the abutment plate 66 of bolt 73 moved to its upper end position by spring 65, and with the gripper tool 12, the cross head 78 moved by spring 81 to its upper end position will just contact the end surface of rod 85. Accordingly, as shown in FIG. 1, the rod gripper is disengaged which means that the turned-out portion 69 of the bolt 62 is located opposite the supporting balls 70. In this position, the head plate 52 of the control bars 51 is by the control rod 56 which is moved upwardly as far as possible and by the supporting balls 55 coupled to the fuel element head 46. With the gripper tool 12, this corresponds to the open position of the gripper pawl 72 indicated in dot-dash lines in FIG. 3.

When the piston 84 is from its FIG. 1 position by the pressure spring 88, if desired, aided by air with higher over-pressure from conduit 87, moved to its lower end position, the rod gripper is closed. This means that the bolt 62 is moved downwardly until it prevents the supporting balls 70 from leaving the annular groove of the sleeve part 71. At the same time, the control rod 56 is by bolts 62 moved to its lower end position in which a recess 89 provided at its lower end occupies a position opposite the supporting balls 55 so that the head plate 52 is disengaged from the sleeve 54 of the fuel element head 46.

Now the gripper body 3 can by means of the winch cables 4 through the intervention of the supporting body 7 of gripper body 3 be lifted so that the plate 52 which is coupled through the gripper tool 11 will be taken along and the control bars 51 will be pulled out of the fuel element.

When in conformity with FIGS. 3 and 4 the gripper tool 12 is coupled to the gripper body 3 and the piston 84 is by spring 88 and, if desired, by air with high over-pressure from conduit 87 moved to its lower end position of FIG. 3, the cross head 78 is against the thrust of spring 81 likewise pressed downwardly so that through the intervention of the elbow lever system 76, the gripper pawls 72 are pivoted into the closing position shown in FIG. 3. Now the fuel element can by lifting the gripper body be pulled out of the reactor core or of a bearing frame.

From the position illustrated in FIG. 6, the gripper tool 11 containing the rod gripper can be coupled to the gripper body 3 by lowering the gripper body 3 by means of the cables 4. Here it is first assumed that the slide 34 occupies its lower end position which means occupies its locking position so that the supporting balls 33 protrude with regard to the collar 30. This is brought about by the fact that air is discharged through conduit 41 from that chamber of the cylinder 38 which is located below the piston 39, so that the pressure spring 43 is able to move the collar 39 to its lower end position. In the conduit 41 there is interposed a shift-over or reversing valve 90 (FIG. 6). The displaceable part of this valve is against the thrust of a spring 91 by means of a plate 92 moved into its upper end position, said plate 92 being located on a rod 93 which extends downwardly from the supporting body 7.

As long as the gripper body 3 by means of its annular flange 10 is supported by the supporting body 7 suspended on cables 4, the plate 92 is relative to the reversing valve mounted on the gripper body 3 moved upwardly to such an extent that the plate 92 holds the displaceable part of the valve in the upper end position shown in FIG. 6. Consequently, the conduit 41 is interrupted which means that the air below the piston 39 is able through the valve 90 to escape in a pressureless manner.

When further lowering the gripper body 3 by means of the cables 4, the protruding supporting balls 33 will engage the inclined surface 26 at the upper rim of bore 25 of the gripper tool in the holding means 47. Consequently, in response to a further lowering of the cables 4, the supporting body 7 moves downwardly relative to the gripper body 3 so that the plate 92 moves into the position indicated in FIG. 6 by dot-dash lines. Consequently, the spring 91 moves the displaceable part of the valve 90 to the lower end position in which the conduit 41 is closed and consequently from the compressed air source with the higher over-pressure air passes below the piston 39 and moves the latter against the thrust of spring 43 upwardly as shown in FIG. 4. Consequently, the surface 36 of slide 34 frees the radial bores 32 so that the supporting balls 33 can move inwardly. Thus, they will no longer prevent the further lowering of the gripper body 3 so that the collar 30 is lowered firmly to the ground of the bore 25. Subsequently, the compressed air is discharged from the cylinder chamber below the piston 39. Consequently, the pressure spring 43 moves the piston 39 to the lower end position according to FIGS. 1 and 3 and thus moves the slide 34 into its locking position in which the supporting balls 33 are kept in engagement with the annular groove 27. The gripper tool 11 is thus coupled to the gripper body 3 and can be pulled out of the holding means 17. This is brought about by pulling up the cables 4 whereby the plate 92 is relative to the gripper body 3 lifted to the position shown in FIG. 6. Consequently, the displaceable part of the valve 90 moves again to its upper end position in which the conduit 41 is interrupted. In this way, it will be assured that no compressed air overcoming the spring 43 can pass below the piston 39. Therefore, the pressure spring 43 keeps the slide 34 in its locking position. In this way, it is assured that an undesired disengaging of the gripper tool 11 mounted on the gripper body 3 cannot occur.

When instead of the gripper tool 11 the gripper tool 12 containing the fuel element gripper is to be coupled to the gripper body 3, first the gripper tool 11 is lowered by lowering the gripper body 3 into the holding means 17 centrally located below the gripper body 3. Subsequently, by conveying air of high over-pressure through conduit 41 below the piston 39, the slide 34 is moved from the locking position upwardly and the gripper body thus disengaged from the gripper tool 11 is lifted off from the gripper tool 11. The gripper tool 11 is held in the holding means 17 by the balls 49 which form a snap closure.

Thereupon the holding means 17 is with the gripper tool 11 moved leftwardly to the FIG. 6 position illustrated by dot-dash lines, whereas the holding means 18 is with the gripper tool 12 moved into the position centrally below the gripper body 3. The gripper tool 12 can now in the described manner by means of the gripper body 3 be pulled out of the holding means 18 while the snap closure of the balls 49 is overcome. Subsequently, the empty holding means 18 is returned to its outer end position at the right hand in frame 13 so that the gripper tool 12 suspended on the gripper body 3 can by lowering the gripper body 3 be lowered through the frame 13 as it is necessary for placing a fuel element head 46. In order to notify the operator, who, in order to avoid danger by radioactivity, has to remain at a great distance from the fuel elements and the control bars, whether a gripper tool is in engagement with the coupling foot of the gripper body and whether it is coupled thereto, the following devices are provided.

Figure 5:
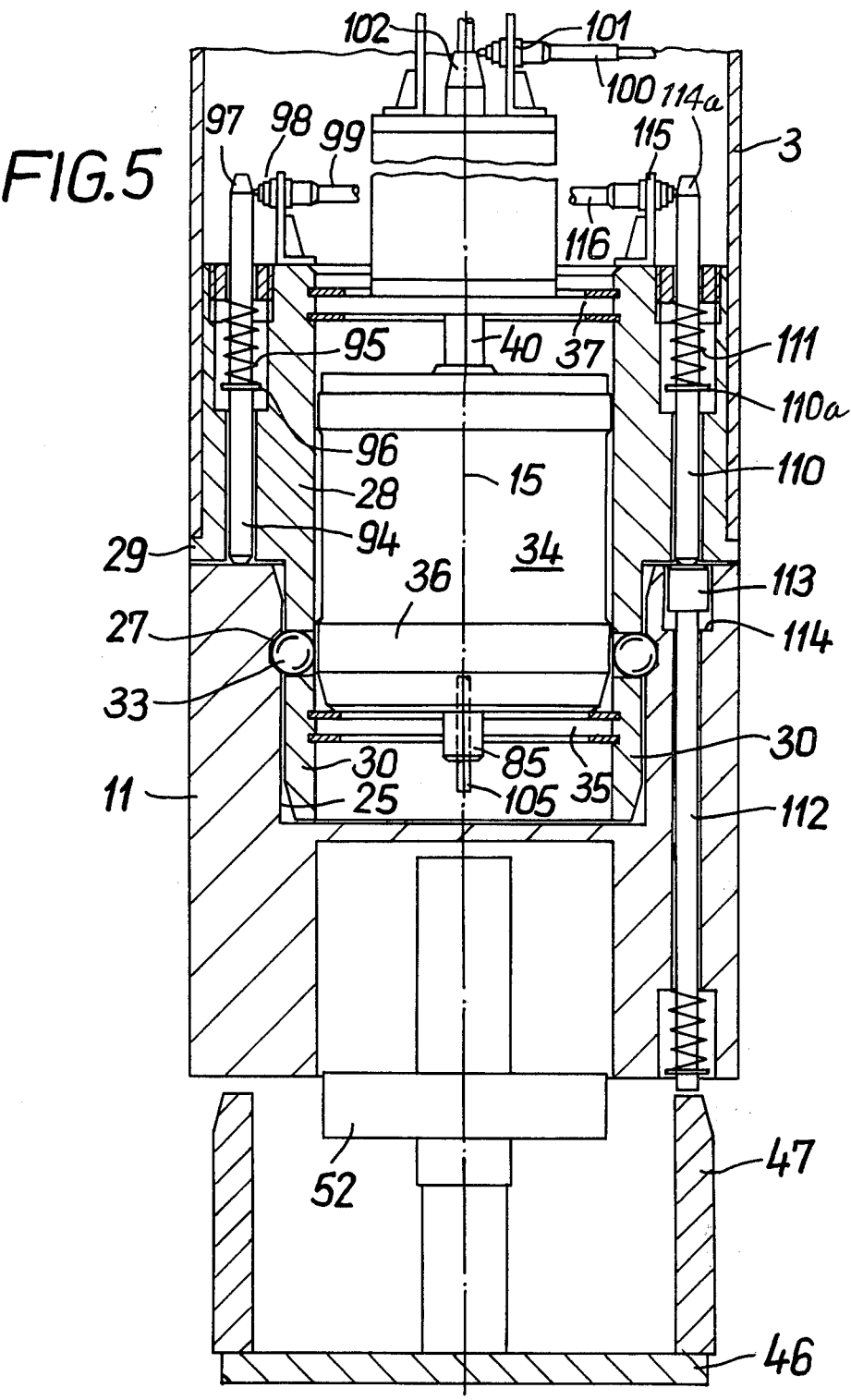
FIG. 5 illustrates in section the lower part of a gripper body adapted to be lifted and lowered, a gripper tool, and a fuel element head, said section being taken along the line V—V of FIG. 2 diagonally with regard to the square cross section.

FIG. 5 shows that in a corner of the housing 28 there is provided a vertical bolt in which a gripper pin 94 is guided. This gripper pin is acted upon by a pressure spring 95 which tends to move the same downwardly so that it will adjacent the collar 30 project from the housing 28. This displacement is limited by a flange on the feeler pin 94 which flange is adapted to engage a step of the above mentioned bore. When the gripper body 3 rests upon a gripper tool for instance, 11, so that the collar 30 rests on the bottom surface of the bore 25, the feeler pin 94 is moved upwardly as far as possible against the thrust of spring 95. Consequently, a conical profile surface 97 at the upper end of feeler pin 94 has actuated a limit feeler 98 which through a conductor 99 conveys a signal to the operator. When the slide 34 reaches its blocking position so that the coupling between the gripper tool 11 and the gripper body 3 is established, this fact is conveyed to the operator through a conductor 100 through a limit feeler 101 which cooperates with a conical profile surface 102 at the upper end of a rod which is located on the piston 39 and extends through the cylinder 38.

A further remote indication is conveyed to the operator by a limit feeler 103 which cooperates with a truncated cone-shaped profile surface 104 at the upper end of a rod which from the piston 84 extends outwardly through a cylinder 82. In this way, the operator knows whether the rod gripper of the gripper tool 11 or of the fuel element gripper of the gripper tool 12 occupies its closing or opening position.

In this connection the operator will also be notified as to whether the head plate 52 of the control bars 51 is coupled to the fuel element head 46 or is disengaged therefrom. To this end there is provided a feeler bar 105 which is displaceably guided in serially arranged bores of the rod 105, the piston 84, the rod comprising the profiled surface 104, the piston 39 and the subsequent bar comprising the profiled surface 102. At that upper end of the feeler bar 105 which end protrudes beyond the last mentioned bar there is provided a cam piston 106 on which a pressure spring 107 which rests against a yoke 108 exerts a force in downward direction. Consequently, the lower end of the feeler pin 105 which is adapted from the flange 67 at the lower end of the bolt 67 to move outwardly in downward direction will always be held in engagement with the flange 60 at the upper end of the control rod 56. Consequently, the cam piston 106 also carries out the movements of the control bar 56 in downward and upward direction. The cam piston 106 therefore through the intervention of a limit feeler 109 indicates to the operator the respective position of the control bar 56 which is indicative as to whether the head plate 52 is coupled or not coupled to the sleeve 54.

Furthermore, the operator is notified whether the gripper tool 11 or 12 has set down properly upon a fuel element head 46. As shown in FIG. 5, in a further corner of housing 28 there is provided an additional vertical bore. In this bore is slideably guided a feeler pin 110 in the same manner as the feeler pin 94. The feeler pin 110 is under the influence of a pressure spring 111 which has the tendency to cause the feeler pin 110 to protrude downwardly from the bore until a flange 110a abuts an abutment. When the gripper tool 11 in the manner shown in FIG. 5 is coupled to the gripper head 3, a vertically arranged bore in the gripper tool is in alignment with the bore of the housing 28 which last mentioned bore contains a feeler pin 110. The above-mentioned vertical bore in the gripper tool contains a feeler pin 112 which by means of a pressure spring is urged downwardly and under the influence of said pressure spring is adapted to move downwardly until a piston 113 at the upper end of the feeler pin 112 engages an abutment surface 114. As long as the gripper tool 11 has not yet properly engaged the fuel element head 46, the feeler pin 112 occupies its lower end position, and the feeler pin 110 is by spring 111 moved downwardly to such an extent that it rests upon the piston 113 while the lower end of the feeler pin 112 protrudes considerably downwardly from the gripper tool 11.

When depositing the gripper tool 11 upon the fuel head 46, the lower end of the feeler pin 112 hits the upper end face of one of the fingers 47 so that with the final placing of the gripper tool 11 upon the fuel element head 46, the feeler pin 112 moves relative to the gripper tool 11 upwardly so that consequently also the feeler pin 110 is relative to the housing 28 moved upwardly. In this connection, through the intervention of a truncated cone-shaped profiled surface 114a located at the upper end of the feeler pin 110, a limit feeler 115 is actuated which through a conductor 115 conveys a signal to the operator. This signal will notify the operator to the effect that the gripper tool 11 or 12 has properly been placed upon the fuel element head 46.

Figure 8:
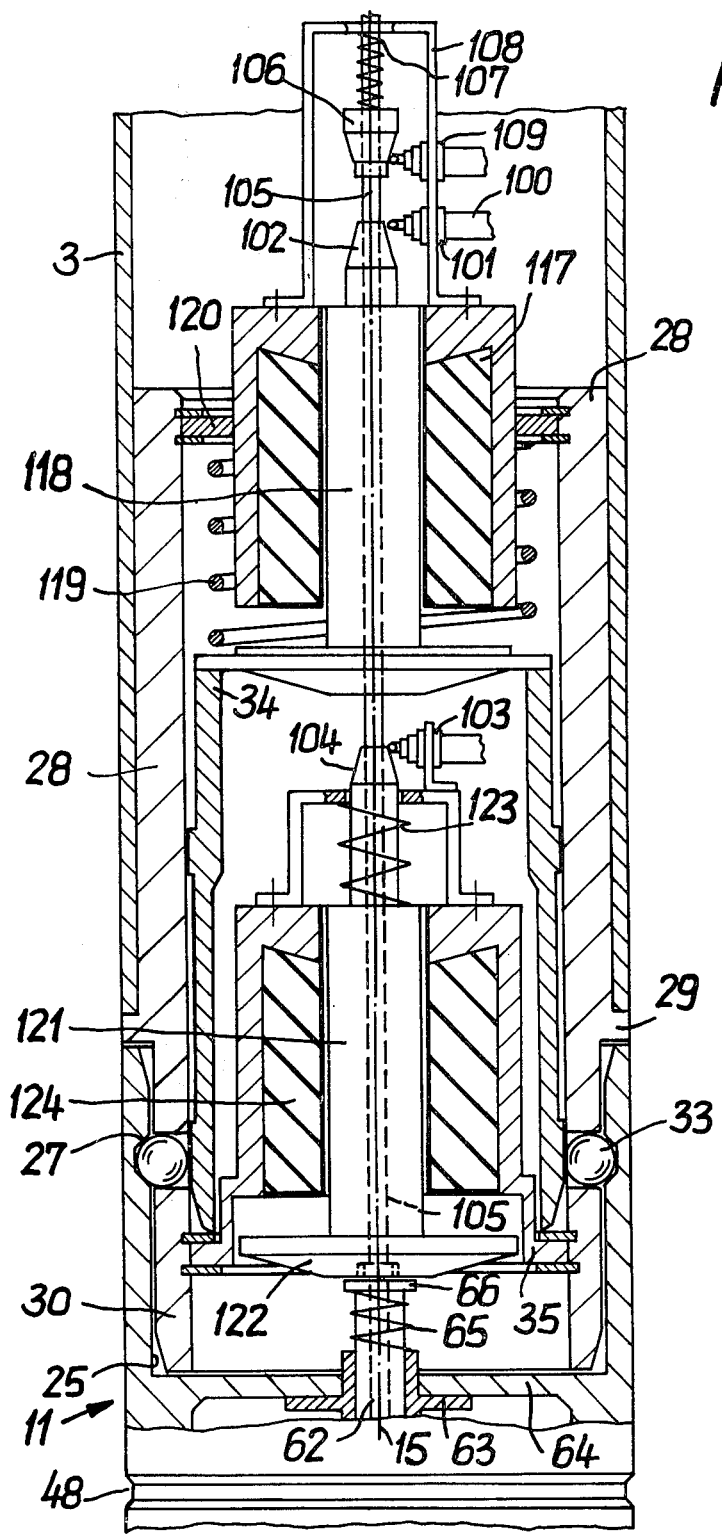
FIG. 8 is a section similar to that of FIG. 1 and illustrates a second embodiment of the present invention.

FIG. 8 shows that the pneumatic power devices 38, 39 and 82, 84 can be replaced by electromagnetic power devices. The rod 40 originating at the piston 39 is replaced by a magnetic core 118 which is located within a magnetic coil 117 while the lower end of the magnetic core 118 has connected thereto the slide 34. The pressure spring 43 in cylinder 38 is replaced by a compression spring 119 which embraces the magnetic coil 117 and is clamped between an upper bottom 120 to housing 28 and the slide 34. The piston 84 is replaced by a magnetic coil 121 having its lower end provided with a plate 122 against which from below the abutment plate 66 is pressed by the spring 65. A compression spring 123 corresponding to the spring 88 tends to press the magnetic coil 121 downwardly. The cylinder 82 is replaced by the magnetic coil 124 which embraces the magnetic core. The magnetic coils 117 and 124 are supplied with electric current through non-illustrated conductors.

Figure 9:
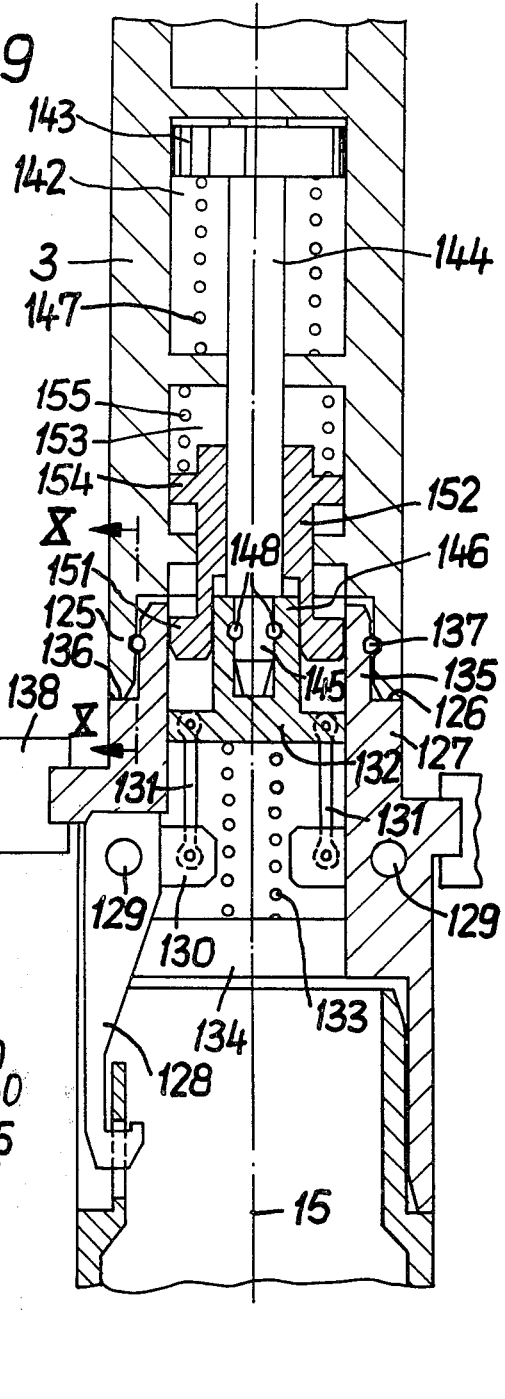
FIG. 9 illustrates a further embodiment in a manner similar to the illustration of FIG. 3.

With the embodiment of FIG. 9, the gripper body 3 ends at its lower end in a collar 125 which when being lowered will seat upon an annular shoulder surface 126 of the gripper tool 127. It may be assumed that a gripper tool with a fuel element gripper is involved. In such a gripper tool, the gripper pawls 128 are pivotable about bolts 129.

Short legs 130 which extend from the gripper pawls 128 at the level of the bolts 129 in the direction toward the center line 15, are engaged by rods 131 which extend upwardly to a disc 132. The bars 131 are pivotally connected to the disc 132 which is vertically displaceably guided in a wide bore of the gripper tool 127. A compression spring 133 which rests on a yoke 134 within the gripper tool 127 tends to move the disc 132 upwardly. In other words, the pressure spring 133 tends to hold the gripper pawls 128 in the closing position shown in FIG. 9.

The gripper tool 127 has an upwardly extending collar 135 the outer diameter of which is shorter than the width of the gripper tool 127 so that the gripper tool 127 forms an annular surface 136 sorrounding the collar 135. In the arrangement of FIG. 9, the gripper body 3 is placed upon the gripper tool 127 and the collar 125 which surrounds the collar 135 rests on the annular surface 136. The gripper body 3 is in this connection connected to the gripper tool 127 through a snap closure. The snap closure is formed by balls 137 which are so arranged in recesses of the collar 125 that they are adapted against the thrust of the springs to escape radially outwardly to such an extent that they do not protrude relative to the cylindrical inner surface of the collar 125. In their closing position shown in FIG. 9, the balls 137 will in view of the pressure exerted by the spring extend into depressions of the collar 135 and fit therein whereby the gripper body 3 is coupled with the gripper tool 127. The disengagement or uncoupling is brought about by pulling the gripper body 3 upwardly while the gripper tool 127 is secured in holding means 138 against a movement in vertical direction.

Figure 10:
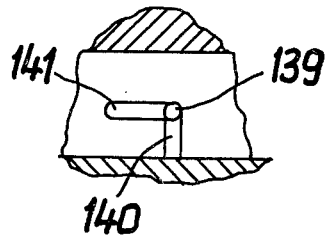
FIG. 10 shows in section a portion of the device according to FIG. 9 with a structural modification, said section being taken along the line X—X of FIG. 9.

There also exists a non-yieldable connection between the gripper body 3 and the gripper tool 127 as shown in FIG. 10. According to FIG. 10, a ball 139 engages a recess of the collar 135 in such a way that the ball protrudes relative to the circumferential surface of said collar. The collar 125 has its inner side provided with a vertical groove 140 into which the ball 139 moves when the gripper body 3 is deposited upon the gripper tool 127. Subsequently, the gripper body 3 is turned relative to the gripper tool 127 in such a way that the ball 139 enters a horizontal groove 141 adjacent the vertical groove 140. In this way a bayonet connection is established between the gripper body 3 and the gripper tool 127.

Within the gripper body there is provided a pneumatic power operable device with a cylinder 142 and a piston 143 from which a piston rod 144 extends vertically downwardly. This piston rod 144 has its lower end provided with a coupling pivot 145 which has a diameter shorter than that of the piston rod 144. When the gripper body 3 in the manner illustrated in FIG. 9 is placed upon the gripper tool 127, the pivot 145 fittingly engages a sleeve 146 which extends upwardly from the slide 132. This slide has been moved to its upper end position by spring 133. Also piston 143 is held in its upper end position by a compression spring 147 located in the cylinder 142. Also between the pivot 146 and the sleeve 145 there is provided a snap closure. This snap closure is formed by balls 148 which are so mounted in recesses of the pivot 145 that they can escape inwardly in radial direction. In coupling position, the balls 148 are by springs radially pressed outwardly in to recesses which are provided on the inner surface of sleeve 146.

The snap closures 137 and 148 may be replaced by non-yieldable coupling elements.

Figure 11:
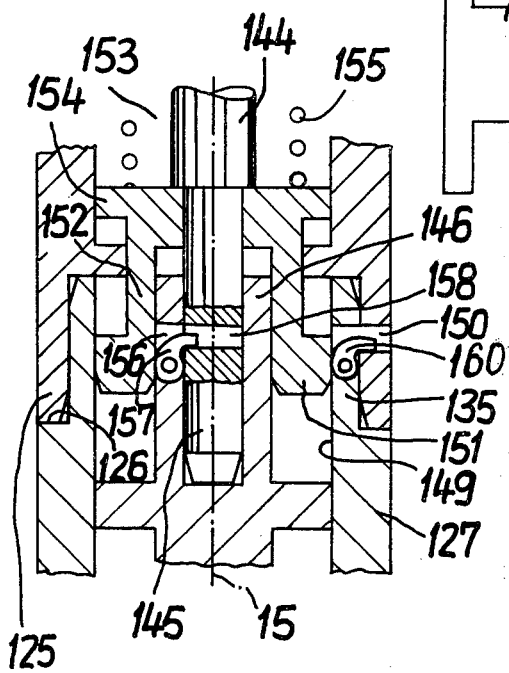
FIG. 11 illustrates a detail of the arrangement of FIG. 9 for a modified construction.

As will be seen from FIG. 11, in openings of the collar 135 there are tiltably mounted pawls 160 which are pivotable about horizontal bolts. According to FIG. 11, the pawls 160 occupy a position in which they do not protrude relative to the cylindrical inner surface 149 of the collar 135 and in which by a finger each they engage recesses 150 of the collar 135. In this way, the gripper body is positively coupled to the gripper tool 127.

Pawls 160 are held in blocking position by a cylindrical slide 151 which is located at the lower end of a control bushing 152 embracing the sleeve 146. Bushing 152 projects upwardly into a cylinder 153 which is located below the cylinder 142. Bushing 152 carries a piston 164 which is guided in cylinder 153. A pressure spring 155 acts upon piston 154 in such a way as to urge the same downwardly.

In recesses 156 of sleeve 146 there are provided pawls 157 which are located at the same level as the pawls 148 and are pivotable about horizontal bolts. In FIG. 11, the pawls 157 occupy a position in which they do not protrude beyond the outer surface of sleeve 146 and with a finger each engage recesses 158 of the coupling pin 145 so that they establish a positive connection between the piston 143 and the disc 132 which serves for setting or adjusting the gripper pawls 128.

The annular slide 151 is provided with inclinations which in response to a lowering of the control bushing 152 by the compression spring 155 move the pawls 160 and 157 into the illustrated blocking position.

In order to disengage the gripper body 3 from the gripper tool 127 and to disengage the piston 143 from the disc 132, the piston 154 is by means of compressed air which is introduced into the cylinder chamber below said piston 154 moved upwardly against the thrust of compression spring 155. Consequently, the annular slide 151 frees the pawls 148 and 157 so that under the influence of non-illustrated springs they will be pivoted in counterclockwise direction (FIG. 11) in such a way that their fingers leave the recesses 150 and 156 respectively.

At any rate, the coupling of the gripper tool to the gripper body 3 is effected in such a manner that first the coupling pin 145 moves outwardly in downward direction by a distance from the gripper body 3 by introducing compressed air into the cylinder chamber above the piston 143. By lowering the gripper body, the coupling pin 145 is introduced into the sleeve. Consequently, the winch cables on which up to that time the gripper body 3 was suspended is relaxed. If now compressed air is allowed to escape from the cylinder chamber above the piston 143, the gripper body will due to its weight move downwardly until it has been placed upon the annular surface 136. The coupling between the gripper body 3 and the gripper tool 127 and also the coupling between the piston 4 and the disc 132 is in this connection effected either by the described snap closures 137, 148 or by means of the pawls 148, 157 by releasing compressed air from the cylinder chamber below the piston 154.

After the gripper tool 127 has been deposited in holding means, it is secured against a lifting out of said holding means. When the snap closures 137, 148 are provided, the separation of the gripper body from the gripper tool and the separation of the coupling pin 145 from the sleeve 146 is effected simply by a lifting movement.

When the bayonet joint according to FIG. 10 is provided, the gripper body 3 must first be so turned that the ball 139 can pass through the vertical groove 140.

When the coupling is effected by the locking pawls 148 and 157, it is necessary that prior to lifting the gripper body 3 by compressed air, which is passed below the piston 154, the annular slide 151 be moved upwardly so that it frees the pawls.

The supporting balls 33, 55, 70 as well as the balls 49, 137 and 148 of snap closures, and the ball 139 are, when the radial bores or recesses receiving said balls are not closed off by blocking elements, prevented from dropping out. This is brought about by constriction of the radial bores or recesses at the exit sides.

It is, of course, to be understood, that the present invention is, by no means, limited by the specific showing in the drawings but also comprises any modifications within the scope of the appended claims.

What is claimed is:

1. A gripping device especially for use in connection with the placement of fuel elements and control bars of a reactor core; a tubular member, a gripper body moveable axially in said member, gripper tools adapted for being coupled to the lower end of said gripper body, a single power operable device in said gripper body for actuating said gripper tools, said gripper tools having like upper and lower guiding means, said upper guiding means being engageable by the lower ends of said gripper body, said lower guiding means being engageable with elements to be placed, said upper guiding means telescopically engaging the lower end of said gripper body, abutment means limiting said telescopic engagement, and connecting means substantially positively connecting the gripper body to a gripper tool in telescopic engagement therewith.

2. A gripping device according to claim 1 in which said connecting means are carried by one of said gripper body and gripper tool on the side facing the other and forming a snap connection therebetween.

3. A gripping device according to claim 1 which includes elements of bayonet latch means on said gripper tool and gripper body engageable by relative rotation between said gripper tool and gripper body when in telescopic engagement.

4. A gripping device according to claim 1 in which said connector means includes radially moveable balls in said gripper body engageable with the gripper tool, and a slide in the gripper body to actuate said balls into gripper tool engaging position.

5. A gripping device according to claim 4 which includes a spring biasing said slide toward locking position and remotely operable means connected to the slide for moving the slide away from locking position.

6. A gripping device according to claim 5 in which said remotely operable means is a fluid motor, a valve connected to the motor, a lift connected to the gripper body for movement thereof vertically, means on the lift operated by lowering of the gripper body to actuate said valve into position to permit said slide to move away from locking position and to raising of said gripper body to cause said slide to move into locking position.

7. A gripping device according to claim 4 in which said slide telescopically surrounds said power operable device.

8. A gripping device according to claim 7 in which the said balls actuated by said slide are within the axial range of said power operable device, and are at all times held captive in said gripper body by said slide.

9. A gripping device according to claim 1 in which said single power operable device is a fluid motor in said gripper body, spring means acting on the fluid motor in a direction to cause closing of said gripper tools, and remotely controlled means for actuating said motor in tool opening direction.

10. A gripping device according to claim 1 which includes cooperating elements of a feeler means on said gripper body and gripper tool for indicating engagement of the tool by said body.

11. A gripping device according to claim 1 which includes a reciprocable member connected to said power operable device for actuation thereby, a profiled region on said member, and a feeler in the gripper body engaging said profiled region for an indication of the actuated position of said member.

12. A gripping device according to claim 1 which includes a first feeler pin in the gripper tool, a second feeler pin in the gripper body engaged by the first pin, and a feeler in the gripper body actuated by said second pin when the gripper tool engages a part to be moved thereby.

13. A gripping device according to claim 1 which includes a frame extending transversely to the axis of said gripper body, at least two gripper tools moveable in said frame, and guide means for said frame dependent from said tubular member.

14. A gripping device according to claim 13 in which said frame includes holding means for supporting said two gripper tools, each holding means adapted for presenting the respective gripper tool to said gripper body for engagement thereby, each holding means being moveable in the frame to clear the space beneath a gripper tool engaged by said gripper body.

15. A gripping device according to claim 14 in which said frame is connected to the lower end of said tubular member, guide means in said frame for guiding said holding means in the lateral direction of said tubular member, each holding means being moveable in the frame from a position of alignment with the gripper body to a position far enough away from said position to permit the other holding means to be moved into said position.

16. A gripping device especially for use in connection with the placement of fuel elements and control bars of a reactor core; a tubular member, a gripper body moveable axially in said member, gripper tools adapted for being coupled to the lower end of said gripper body, a single power operable device in said gripper body for actuating said gripper tools, said single power operable device being a fluid motor in said gripper body, spring means acting on the fluid motor in a direction to cause closing of said gripper tools, remotely controlled means for actuating said motor in tool opening direction, said gripper tool having an adjustable body therein, said fluid motor including an element engageable with said adjustable body, and connector means for connecting said element to said adjustable body.

17. A gripping device according to claim 16 in which said connector means is in the form of pivoted pawls.

18. A gripping device according to claim 16 in which said adjustable body is spring biased toward tool unlocking position, tool actuating elements in said gripper tool, and spring means in said gripper tool biasing said tool actuating elements into abutting engagement with said adjustable body.

19. A gripping device according to claim 16 in which said connector means comprise pawls pivotally mounted on the upper end of said gripper tool, recesses in the gripper body to receive the pawls, and a member carried by said gripper body and operable to move said pawls into said recesses upon reciprocation of said member on said gripper body.

20. A gripping device according to claim 19 in which movement of said power operable device in tool locking direction also locks said pawls in said recesses.

21. A gripping device according to claim 20 in which said power operable device is on the opposite side of said member from said gripper tool and includes a rod extending reciprocably through said member for actuating said tools between release and locking positions, and spring means biasing said rod in tool locking direction.

22. a. A gripping device for use in connection with the placement of longitudinal bodies, especially of fuel elements and control bars of a reactor core, comprising:
 b. a tubular member,
 c. a gripper body movable axially in said member,
 d. at least two various gripper tools each of which is determined for another group of longitudinal bodies and has upper guiding means,
 e. the upper guiding means of all gripper tools being adapted to the same guiding means at the lower end of the gripper body,
 f. in such a manner that selectively only one of said gripper tools may be attached to the gripper body in its operational position and coupled to the gripper body by connector means,
 g. said gripper body containing a power operable device for actuating any one gripper tool which will be coupled to the gripper body.

23. A gripping device according to claim 22 in which said various gripper tools further have lower guiding means adapted to guiding means at the upper end of longitudinal bodies to be placed, said upper guiding means and said lower guiding means of said gripper tools engaging the guiding means at the lower end of the gripper body and the guiding means at the upper end of longitudinal bodies respectively telescopically, abutment means limiting said telescopic engagement.

24. A gripping device according to claim 22 in which said connector means includes radially moveable balls in said gripper body engageable with one gripper tool, and a slide in the gripper body to actuate said balls into gripper tool engaging position.

25. A gripping device according to claim 24 which includes a spring biasing said slide toward locking position and remotely operable means connected to the slide for moving the slide away from locking position.

26. A gripping device according to claim 25 in which said remotely operable means is a fluid motor, a valve connected to the motor, a lift member telescopically guided within and engageable with said gripper body for raising it, abutment means fixed to said lifting member in such arrangement that by lowering said lifting member relative to the gripper body said valve will be actuated into position to permit said slide to move away from locking position whereas by raising of said gripper body by said lifting member said valve will be actuated into position to cause said slide to move into locking position.

27. A gripping device according to claim 25 in which said remotely operable means includes a reciprocable bar provided with a profiled region a feeler in the gripper body engaging said profiled region for an indication of the actuated position of said member.

28. A gripping device according to claim 25 which includes a first feeler pin in the gripper tool, a second feeler pin in the gripper body engaged by the first pin, and a feeler in the gripper body actuated by said second pin when the gripper tool engages a part to be moved thereby.

29. A gripping device according to claim 24 in which said slide telescopically surrounds said power operable device.

30. A gripping device according to claim 22 in which said power operable device includes an adjusting element engageable with an adjustable body vertically shiftably guided within each gripper tool for actuating coupling means by which said gripper tool may be coupled to any one of said longitudinal bodies.

31. A gripping device according to claim 30 in which said adjustable body is spring biased toward tool unlocking position.

32. A gripping device according to claim 22 in which said connector means form a snap connection between said gripper body and any gripper tool.

33. A gripping device according to claim 22 which includes elements of bayonet latch means on any gripper tool and said gripper body engageable by relative rotation between said gripper tool and gripper body when in telescopic engagement.

34. A gripping device according to claim 22 in which said connector means comprise pawls pivotally mounted on the upper end of any gripper tool, recesses in the gripper body to receive pawls, and a member carried by said gripper body and operable to move said pawls into said recesses upon reciprocation of said member in said gripper body.

35. A gripping device according to claim 34 in which said power operable device is arranged in said gripper body above said member and includes a rod extending reciprocably through said member and into a bore of an actuating body for actuating said tool between release and locking positions, further pawls pivotally mounted in openings of said actuating body engaging recesses in said rod, said member being operable to move said further pawls into said recesses.

36. A gripping device according to claim 22 which includes cooperating elements of a feeler means on said gripper body and gripper tool for indicating engagement of the tool by said body.

37. A gripping device according to claim 22 which includes a frame attached at the lower end of said tubular member and extending transversely to the axis of said gripper body, at least two gripper tools moveable in said frame.

38. A gripping device according to claim 37 in which said frame includes holding means for supporting said two gripper tools each holding means adapted for presenting the respective gripper tool to said gripper body for engagement thereby, each holding means being moveable in the frame to clear the space beneath a gripper tool engaged by said gripper body.

39. A gripping device according to claim 38 in which said frame includes guide means for guiding said holding means in the lateral direction of said tubular member, each holding means being moveable in the frame from a position of alignment with the gripper body to a position far enough away from said position to permit the other holding means to be moved into said position.

* * * * *